April 9, 1963 P. S. DECATUR 3,084,799
TIME DELAY CONTROL APPARATUS
Filed March 21, 1960 4 Sheets-Sheet 1
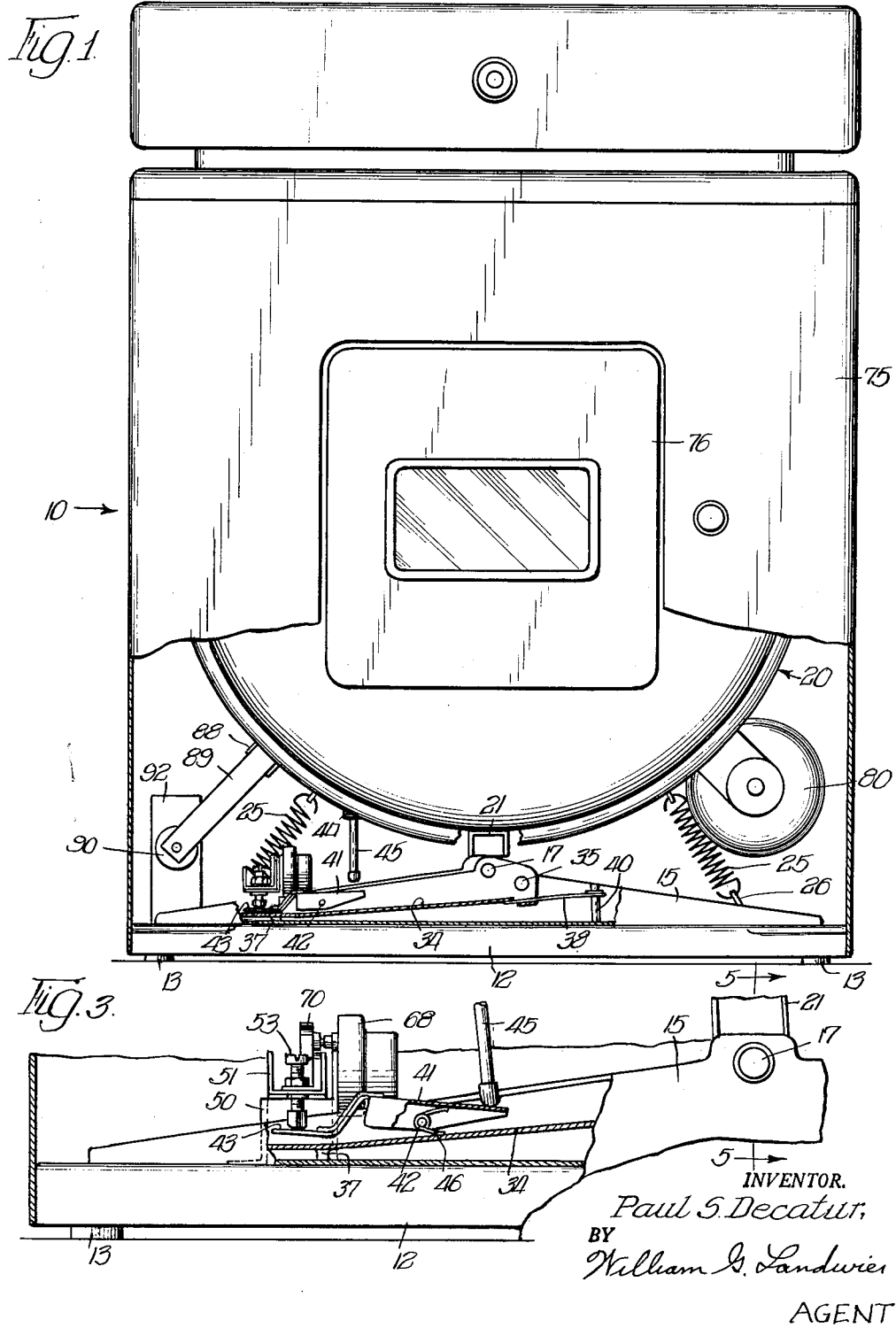
INVENTOR.
Paul S. Decatur,
BY
William G. Landwier
AGENT April 9, 1963 P. S. DECATUR 3,084,799
TIME DELAY CONTROL APPARATUS
Filed March 21, 1960 4 Sheets-Sheet 2
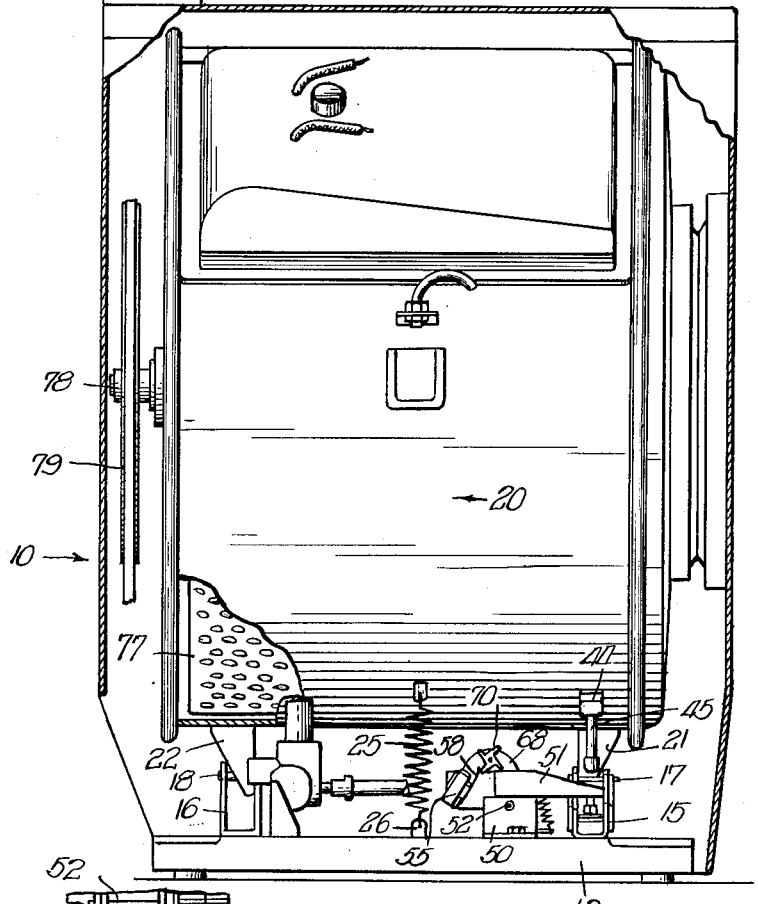
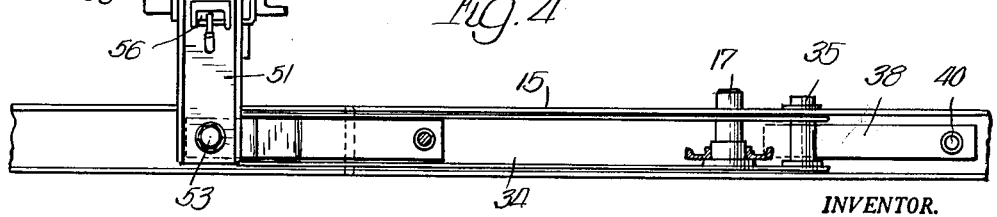
INVENTOR.
Paul S. Decatur,
BY
William G. Landwier
AGENT

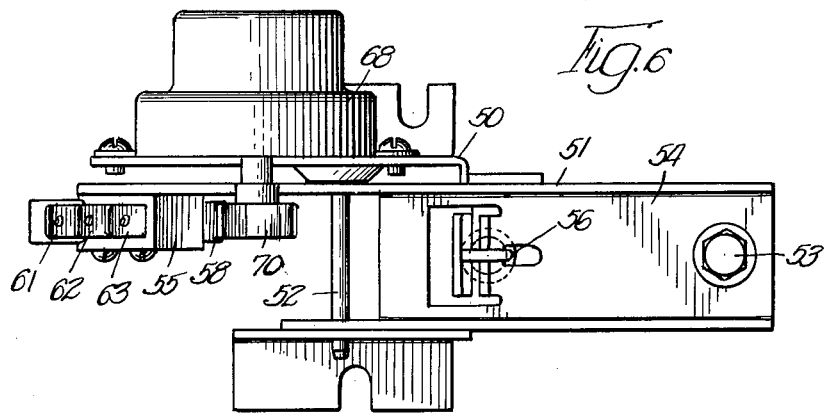

April 9, 1963 P. S. DECATUR 3,084,799
TIME DELAY CONTROL APPARATUS
Filed March 21, 1960 4 Sheets-Sheet 4

INVENTOR.
Paul S. Decatur,
BY
William G. Landwier
AGENT

United States Patent Office 3,084,799
Patented Apr. 9, 1963

3,084,799
TIME DELAY CONTROL APPARATUS
Paul S. Decatur, Grinnell, Iowa, assignor to The Maytag Company, Newton, Iowa, a corporation of Delaware
Filed Mar. 21, 1960, Ser. No. 16,341
2 Claims. (Cl. 210—144)

This invention relates to a system for preventing a fluid extractor from moving relative to, lifting from, or sliding on, a supporting floor surface in reaction to centrifugal forces developed by high speed rotation of unbalanced, or acentric, clothes loads, and more particularly, to a control mechanism for regulating the drive mechanism of a fluid extractor in response to unbalanced load conditions.

The present invention may be utilized, for example, in a combination washer-drier unit having a device for sensing a predetermined maximum unbalanced centrifugal force generated by the rotation of an unbalanced clothes load during fluid extraction operations. The sensing device is associated with a control switch mechanism the latter of which controls the unit transmission, in order to regulate the rotational speed of the revoluble basket. The control switch mechanism automatically interrupts the basket's rotational speed to effect a redistribution, or a rearrangement, of the fabric load within the basket for a period of time in an attempt to sufficiently reduce the acentric, or unbalanced, load conditions. The control switch mechanism prevents movement of the extractor relative to its supporting force surface by preventing generation of greater disturbing forces which would be created by the continued acceleration of the unbalanced fabric load.

It is, therefore, an object of the invention to provide a control mechanism responsive to undesirable conditions for controlling rotation of a centrifugal system. It is a further object of the invention to provide a control mechanism for centrifugal extractors, which after actuation by unbalanced load conditions assumes control of the drive mechanism for a predetermined time period. It is a still further object of the invention to provide a switch mechanism including associated devices which responds to conditions determined by a sensing device to assume a predetermined position for a predetermined time. It is another object of the invention to provide a control switch mechanism for use in a fluid extractor, such as a combination washer-drier, in order to prevent development of undesirable centrifugal forces created by high speed rotation of unbalanced fabric loads.

Further objects and advantages of this invention will become evident as the description proceeds and from an examination of the accompanying drawings which illustrate one embodiment of the invention and in which similar numerals refer to similar parts throughout the several views.

In the drawings:

FIGURE 1 is a view in front elevation of a combination washer-drier, partially broken away illustrating the control system forming the subject matter of this invention in a combination washer-drier unit;

FIGURE 2 is a view in side elevation, partially broken away, showing the left side of the combination washer-drier shown in FIGURE 1;

FIGURE 3 is an enlarged fragmentary view showing the actuation of the control switch by the amplitude sensing device incorporated in the washer-drier unit;

FIGURE 4 is a fragmentary plan view of the front support and the control switch shown in FIGURE 3;

FIGURE 6 is a top plan view of the control switch and time delay mechanism of the invention;

FIGURE 7 is a view in elevation of the control switch and time delay mechanism in normal position;

FIGURE 8 is a view similar to FIGURE 7 showing the switch and time delay mechanism immediately after an unbalanced load condition;

Figure 10:
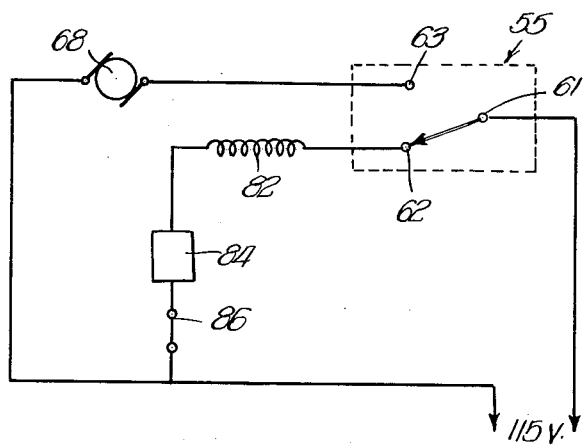

FIGURE 10 diagrammatically illustrates a circuit incorporating the switch and time delay mechanism.

In the accompanying drawings, the combination washer-drier unit is designated generally by reference numeral 10. The unit is supported on a substantially flat surface base frame 12 having legs 13.

Mounted upon base frame 12 are the channel members 15 and 16 which are securely affixed in some suitable manner to base frame 12, such as by welding, to form the two major supports for the washer-drier unit illustrated in the accompanying figures. Each channel member has a single pivot pin 17, 18 about which the tub, or casing is free to pivot in an arcuate movement.

Pivot pins 17, 18 form a two point support for tub brackets 21 and 22, respectively. This allows the tub or casing 20 which is fastened to brackets 21 and 22 to oscillate back and forth on pins 17, 18 in an arcuate movement in response to various forces generated within.

Tub 20 is maintained in an upright position on pins 17, 18 by two centering springs 25. The centering springs are connected between tub 20 and base 12 through the spring anchor brackets 26 fastened to the latter member.

Figure 5:
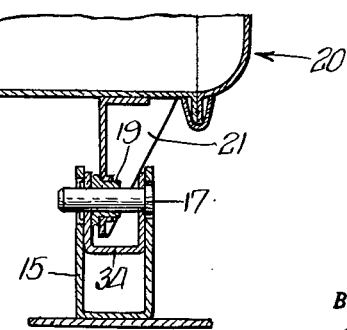
FIGURE 5 is an enlarged cross-sectional view taken substantially along line 5—5 of FIGURE 3.

While the rear channel member 16 actually receives and supports directly the rear pivot pin 18, inspection of FIGURE 5 indicates that the same is not true as to the connection between front channel 15 and the front pivot pin 17. That cross-sectional view shows that front pivot pin 17 is actually suspended in a floating pivot in front channel member 15 and, in practice has a clearance of approximately one-sixteenth of an inch from the closest point of channel 15. The front end of tub 20 is supported on the front tub bracket 21, which in turn is mounted on the front bearing sleeve 19 and on the front pivot pin 17. Pivot pin 17 is in turn supported by a lever arm 34 nested within front channel 15 and supported on the pivot pin 35 penetrating channel member 15, as clearly shown in FIGURES 3, 4, and 5.

Movement of the long lever arm 34 about pin 35 determines whether or not the front pivot pin 17 moves relative to the front channel member 15. It will be noted that, in any event, front pivot pin 17 may move only a short distance, in the structure illustrated, approximately one-sixteenth of an inch, before the head of pivot pin 17 will contact channel member 15 and limit further movement of that pin, and consequently tub 20, in a vertical plane. While this limit stop for pin 17 prevents tub 20 from separating from channel 15 when the entire machine is tipped over or upended, it is not necessary in the basic operation of the control device forming the basis for the instant invention.

Three forces acting on lever arm 34 establish a condition of equilibrium about pin 35 in order to produce the described floating pivot about front pivot pin 17. The first of these three forces is applied upwardly through the supporting foot 37 (FIGURE 3) preferably formed of rubber or some other cushioning material, located at the end of arm 34. The weight of tub 20 and the parts supported by that casing provide the second force which is applied directly to lever arm 34 through pin 17. The third force acting on member 34 is exerted by a leaf spring 38 which is inserted into opening lever arm 34 so as to form an extension of the latter member. An adjustable machine screw 40 which passes through the base of channel 15 and base frame 12, as well as the end of leaf spring extension 38, provides the means of varying the force exerted downwardly on leaf spring extension 38. In other words, as the end of leaf spring 38 is moved closer toward base frame 12 by tightening the adjustable screw 40, the lever arm 34 will have a greater tendency to move in a clockwise direction as viewed in FIGURE 1. It should, therefore, be apparent that the weight of tub 20 and all parts supported by it tends to move lever arm 34 in a counterclockwise direction about pin 35, whereas the flexed leaf spring extension 38 tends to move it in a clockwise direction thereby producing a floating pivot action for front pivot pin 17 relative to the front channel member 15.

Lever arm 34 supports lever member 41 pivoted at 42. Lever 41 has a flat extension 43 abutting the extreme left end of lever arm 34.

Tub 20 is provided with a supporting bracket 44 from which depends a cushioned plunger member 45 capable of being adjusted toward and away from lever 41. In FIGURES 1 and 3 it will be apparent that arcuate movement of tub 20 about its supporting pivot pins 17 and 18 will cause plunger 45 to engage lever 41 and move it into the position shown in FIGURE 3. A small coil spring 46 wound around the pivot pin 42 of lever 41 returns lever 41 to the position of FIGURE 1 after plunger 45 rocks away from the position as shown in FIGURE 3. Likewise, an upward movement of the left end of lever 34 will lift extension 43 of lever 41 upwardly.

Referring now to FIGURES 2, 3, 4 and 6 through 9 of the drawings, it will be noted that a bracket 50 is secured, as by screws, to the base frame 12. A lever 51 is pivotally mounted on front wall 57 of the bracket 50. An adjustable cushioned plunger 53 is mounted on the arm 54 of lever 51 above extension 43 and lever arm 34. Supported on the opposite end of lever 51 is a switch member in the form of a "Microswitch" 55.

A stop in the form of a pin 52 extends between the sides of bracket 50 and through a slot in lever 51. Lever 51 is normally biased by coil spring 56, so that the bottom portion of the slot of lever 51 contacts the stop 52 of bracket 50. Coil spring 56 is connected between arm 54 of lever 51 and the bracket 50.

Microswitch 55 has a spring biased plunger, or switch button, 59 for operating the switch contacts thereof. A leaf spring arm 58 of the Microswitch 55 is normally biased away from the resilient button 59. Three terminals 61, 62 and 63 project from the Microswitch 55. Terminal 61 is a common lead. Terminal 62 is connected to a switch contact which is normally open, while terminal 63 is connected to a switch contact that is normally closed, when the switch button 59 is released, or fully extended, as in FIGURES 8 and 9. However, when the plunger 59 is depressed, as in FIGURE 7, the switch contact of terminal 62 is closed and the switch contact of terminal 63 is opened.

Figure 9:
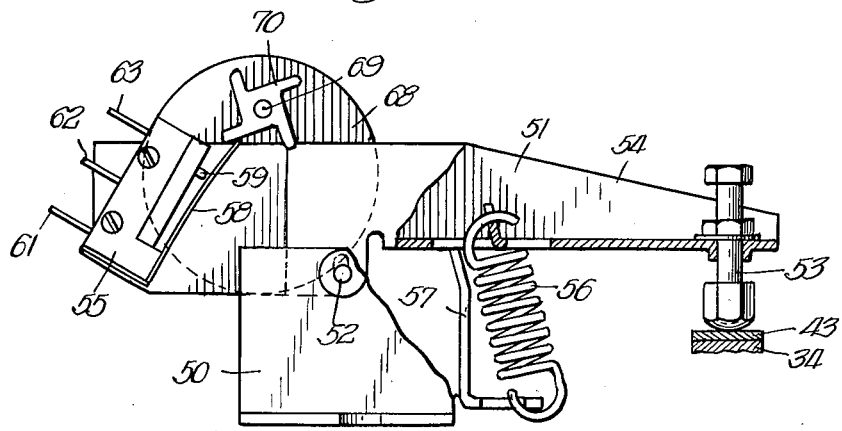
FIGURE 9 is a view similar to FIGURE 7, showing the switch and time delay mechanism after an unbalanced load condition has caused the switch to be released and before the switch has been restored to normal position by the time delay mechanism.

Button 59 is normally held depressed by spring arm 58 through one leg of a starwheel, or cam, 70, as best shown in FIGURE 7. However, when the lever 51 is pivoted on 57 in a counterclockwise direction, as shown in FIGURE 8, the spring arm 58 is disengaged from the leg of the starwheel to release the button 59. When the spring arm 58 of the Microswitch 55 is released it springs to a position behind the leg of starwheel 70, so that, when the lever 51 is returned by spring 56 with bottom portion of the slot against stop 52, as illustrated in FIGURE 9, spring arm 58 remains disengaged from the starwheel, and the button 59 of the Microswitch remains in released position.

Starwheel 70 is mounted on a shaft 69 of delay timer motor 68. Delay timer motor 68 is connected to terminal 63 of Microswitch 55, as shown in FIGURE 10, so that when the button 59 is fully released the contact switch of terminal 63 is closed, thus energizing the delay timer motor 68. When the delay timer motor 68 is energized, it rotates shaft 69 and starwheel 70 at a certain speed in order that after a predetermined period of time, for example, thirty seconds, the next successive leg of the starwheel contacts and engages the spring arm 58 to depress button 59. At this time, the switch contact of terminal 63 is opened, motor 68 de-energized, the starwheel 70 stopped in the position shown in FIGURE 7, and the switch contact 62 closed.

Referring now to FIGURE 10, terminal 62 is connected to a solenoid 82 which controls the clutch of the drive mechanism 80 for the basket 77 within tub 20. The spin solenoid is also controlled by a timer mechanism 84 and water level switch 86 in series therewith. It will be understood that the circuitry may be modified to accommodate various arrangements within the skill of persons in the art.

When the Microswitch 55 is in the position shown in FIGURE 7 with the plunger depressed, the switch of terminal 62 is normally closed energizing solenoid 82 to permit the drive mechanism to rotate at high speeds for extracting waters from the fabrics within the clothes basket. However, when the button 59 is released, as shown in FIGURE 8, the switch of terminal 62 is opened causing the drive mechanism to shift from high extraction speeds to the slower tumbling speeds.

From the foregoing, it will be apparent that arcuate movement of the tub 20 about its supporting pivot pin 17, 18 will cause the plunger 45 to engage lever 41 and move it to the position shown in FIGURE 3 in which the extension 43 will engage and raise the plunger 53 of lever 51 to place the Microswitch in the position shown in FIGURE 8, after which it returns to the position shown in FIGURE 9. Likewise, an upward movement of the left end of lever arm 34 will move the plunger 53 upwardly to operate Microswitch 55 independently of any pivoting movement of the lever 41, although lever 41 is itself supported on lever arm 34 so that the extension 43 serves as a force transmitting member during this latter movement.

In other words, switch 55 may be opened either by a large arcuate movement of tub 20 or by an upward movement of that tub member. It is emphasized at this point that while each tub movement may open switch 55, the controls sensing these two movements perform separate functions since an arcuate movement of tub 20 opens switch 55 to prevent contact between tub 20 and the cabinet while vertical movement of tub 20 opens switch 55 to prevent movement of the entire machine relative to its supporting floor surface.

Referring now to the assembly supported on pin 17 and 18, it will be seen that the tub or casing 20 is mounted within a cabinet 75. The cabinet is provided with a rectangular door 76 for inserting clothes into the basket within the tub 20.

The clothes basket 77 within tub 20 is mounted on a drive shaft 78 rigidly connected to a large drive pulley 79 and rotated by drive mechanism 80 (FIGURE 1).

The arcuate movement of tub 20 is controlled in the illustrated machine to prevent contact between the tub 20 and the sides of the cabinet 75. The tub carried plunger 45 and the amplitude sensing lever 41 could therefore be eliminated if this type of control were not desired.

FIGURE 1 shows a damper bracket 88 secured to tub 20. Bracket 88 supports damper leaf spring 89 carrying the damper pad 90. An upstanding damper plate 92 fastened to base frame 12 engages damper pad to absorb and dissipate the energy which causes the tub to oscillate on supporting pivot pins 17, 18.

From the foregoing, it is believed operation is apparent. Tub 20 may be filled to the desired fluid level for the washing operations. Following the conventional washing operations during which time clothes basket 77 is rotated at a tumbling speed of approximately 50 revolutions per minute, tub 20 is drained.

At the beginning of the centrifuging operations, solenoid 82 controlling the drive mechanism is energized to shift the tumbler speed from 50 revolutions per minute to approximately 300 revolutions per minute to centrifugally separate most of the residual fluids from the fabrics carried within clothes basket 77. Should an excessively unbalanced load such as a fourteen pound unbalance or the torque reaction to this speed change cause a wide arcuate movement of the tub 20 relative to the base frame 12 at speeds in the region of resonance, plunger 45 will rock lever 41 into the position of FIGURE 3. Lever 41 contacts plunger 53 to pivot lever 51 to release spring arm 58 and button 59 for a period dependent upon the delay timer motor 68. When button 59 is released switch contact 62 is opened to de-energize solenoid 82 and reduce the rotational speed of clothes basket 77 to its tumbling speed in order to prevent contact between tub assembly 20 and its enclosing cabinet 75 at rotational speeds just above the tumble speed. It will also permit a redistribution of the fabrics within clothes basket 77 prior to solenoid 82 being reenergized for subsequent tumbler accelerations.

When button 59 of the Microswitch 55 is released, the timer delay motor 68, connected to the switch contact of terminal 63 is energized to rotate shaft 69 and starwheel 70. After a preselected period the starwheel 70 depresses spring arm 58 and button 59 to the position illustrated in FIGURE 7.

It will be noted that the lever 51 is pivoted due to unbalance load conditions sensed either by the lever arm 34 or the lever 41 to the position of FIGURE 8. Consequently, whenever an unbalanced load condition exists within the clothes basket which causes the tub 20 to move relative to the cabinet 75, the control mechanism of the present invention interrupts the drive mechanism to slow it to a tumbling speed for a predetermined time regulated by the timer delay motor 68.

During this time the clothes are again tumbled and redistributed within the clothes basket to reduce, or eliminate the unbalanced condition. However, if the unbalanced condition is maintained, when the starwheel again operates to depress the button 59 of the Microswitch to energize solenoid 82 and accelerate the clothes basket, the unbalanced situation will again be sensed to again pivot lever 51 and slow down the drive mechanism from extraction to tumbling speeds. This cycle is repeated until the fabrics within the basket are sufficiently distributed to prevent the disturbing forces sensed by levers 34 and 41. The triggering of switch 55 may normally occur several times in each centrifuging operation.

The present invention is related to the subject matter of application of John C. Mellinger, Serial No. 686,450, filed September 26, 1957.

In the drawings and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claims.

I claim:

1. In a laundry apparatus for centrifuging fluid from fabrics, a combination comprising: a support member; a tub pivotally mounted on said support member; a revoluble clothes receptacle in said tub adapted to receive said fabrics; drive means for selectively rotating said receptacle at high extraction speeds and a lower speed; and control means responsive to a predetermined vertical movement of said tub during said extraction speeds for selecting said lower speed of said drive means for a predetermined time before returning said drive means to said higher speeds, said control means including a lever member pivotally mounted on said support member, means responsive to vertical movement of said tub relative to the pivotal mounting thereof for actuating said lever member, a switch member secured to said lever member having switch contacts movable to a first posture for completing a circuit selecting said high speeds and movable to a second posture completing a circuit selecting said lower speed and normally maintained in a first position with switch contacts therein in a first posture completing a circuit selecting said high speeds, said lever member being sensitive to a predetermined vertical movement of said tub for moving said switch member to a second position with said switch contacts actuated to a second posture completing a circuit selecting said lower speed, resilient means connected between said support member and said lever for returning said lever and said switch member thereon to said first position, delay means for returning said switch contacts to said first posture following return of said switch member to said first position and after a predetermined time delay.

2. The invention as set forth in claim 1 and said means responsive to vertical movement of said tub relative to the pivotal mounting thereof further including an arm member operatively connected to said pivotal mounting and pivotally mounted on said support member.

References Cited in the file of this patent

UNITED STATES PATENTS

| | | |
|---|---|---|
| 2,026,510 | Moyer | Dec. 31, 1935 |
| 2,035,481 | Hume | Mar. 31, 1936 |
| 2,311,545 | Hurley | Feb. 16, 1943 |
| 2,311,924 | Bassett | Feb. 23, 1943 |
| 2,780,086 | Dunlap | Feb. 5, 1957 |
| 2,784,584 | Worst | Mar. 12, 1957 |
| 2,807,952 | Bochan et al. | Oct. 1, 1957 |
| 2,813,415 | Clark | Nov. 19, 1957 |
| 2,832,208 | Stone | Apr. 29, 1958 |
| 2,911,812 | Metzger | Nov. 10, 1959 |
| 2,978,892 | Behrens et al. | Apr. 11, 1961 |

FOREIGN PATENTS

| | | |
|---|---|---|
| 1,106,055 | France | July 11, 1954 |